United States Patent
Eriksson et al.

(10) Patent No.: US 9,439,101 B2
(45) Date of Patent: Sep. 6, 2016

(54) METHOD AND APPARATUS RELATED TO WIRE LINE BACKHAUL

(71) Applicant: TELEFONAKTIEBOLAGET L M ERICSSON (PUBL), Stockholm (SE)

(72) Inventors: Per-Erik Eriksson, Stockholm (SE); Miguel Berg, Upplands Väsby (SE); Chenguang Lu, Sollentuna (SE); Elmar Trojer, Täby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/647,850

(22) PCT Filed: Nov. 28, 2012

(86) PCT No.: PCT/SE2012/051318
§ 371 (c)(1),
(2) Date: May 28, 2015

(87) PCT Pub. No.: WO2014/084764
PCT Pub. Date: Jun. 5, 2014

(65) Prior Publication Data
US 2015/0327140 A1    Nov. 12, 2015

(51) Int. Cl.
| H04W 36/00 | (2009.01) |
| H04W 28/02 | (2009.01) |
| H04W 28/08 | (2009.01) |
| H04W 36/22 | (2009.01) |
| H04W 88/08 | (2009.01) |
| H04W 36/16 | (2009.01) |

(52) U.S. Cl.
CPC ......... *H04W 28/0247* (2013.01); *H04W 28/08* (2013.01); *H04W 36/22* (2013.01); *H04W 36/165* (2013.01); *H04W 88/08* (2013.01)

(58) Field of Classification Search
CPC ..... H04L 47/11; H04L 45/00; H04L 45/123; H04W 28/08; H04W 36/22; H04W 16/08
USPC ......................................................... 455/438
See application file for complete search history.

(56) References Cited

U.S. PATENT DOCUMENTS

| 2011/0131319 A1* | 6/2011 | Harrang .................. H04L 47/11 709/224 |
| 2012/0327779 A1* | 12/2012 | Gell ..................... H04L 47/6275 370/238 |
| 2014/0073317 A1* | 3/2014 | Zhou ................. H04W 28/0205 455/424 |

FOREIGN PATENT DOCUMENTS

GB    2454872 A    5/2009

OTHER PUBLICATIONS

Tarik, et al., "QoS/QoE predictions-based admission control for femto communications," Communications (ICC), 2012 IEEE International Conference On, IEEE, Jun. 10, 2012 pp. 5146-5150, XP032274115, abstract, Sections I, II and III.

* cited by examiner

Primary Examiner — Don N Vo

(57) ABSTRACT

Presented are methods and arrangements for adapting the load in a cell based on information on upcoming events related to a backhaul link. The upcoming events related to the backhaul link may be delayed in order to give enough time for an RBS to complete activities related to the load adaptation. Thus, UEs may be handed over to neighboring cells proactively, before the cell becomes overloaded due to events related to the backhaul link.

22 Claims, 10 Drawing Sheets

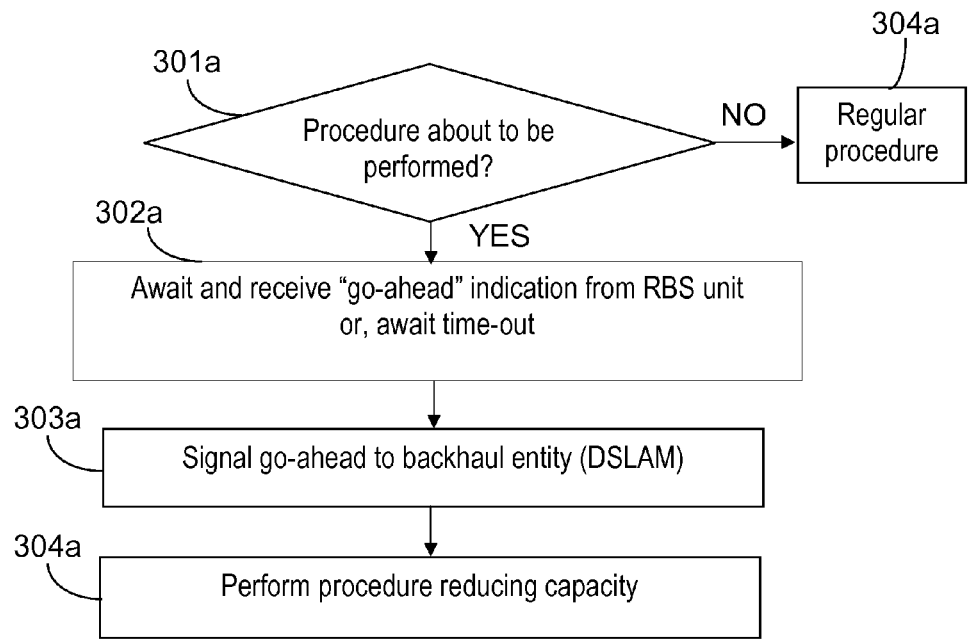
Figure 3a (CPE)
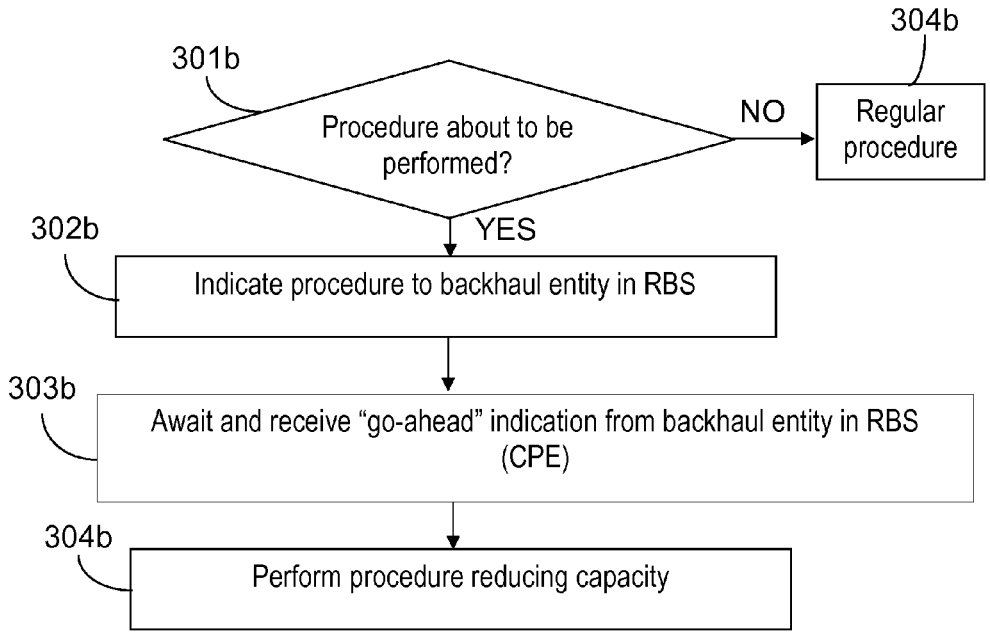
Figure 3b (DSLAM)

METHOD AND APPARATUS RELATED TO WIRE LINE BACKHAUL

This application is a 371 of International Application PCT/SE2012/051318, filed Nov. 28, 2012, the disclosure of which is fully incorporated herein by reference.

TECHNICAL FIELD

The herein suggested technology relates to wire line backhaul of radio base stations.

BACKGROUND

Today, there is a rapid increase of data traffic in mobile networks, due e.g. to increased use of mobile broadband and smartphone applications. This increase in data traffic results in heavy demands for more capacity in the mobile networks. To meet these demands, there is a need for a large densification of radio base stations (RBSs), and heterogeneous networks are envisioned, comprising cells of different sizes, such as e.g. so-called macro cells, pico cells and femto cells. The RBSs serving these cells need to be connected to a core network. The link between an RBS and a core network is often referred to as a backhaul link.

The traditional alternatives for a backhaul link for a macro cell are microwave (MW), fiber and leased line copper. However, for small cell indoor scenarios there is limited availability of fiber and not always possible to use MW links. Instead, it may be required and/or suitable to reuse existing wire lines, such as telephone graded copper cables or CAT3 & CAT5. In such a scenario, small cells like pico cells or femto cells will use ADSL2/ADSL2plus, VDSL2, or the coming new standard G.fast for mobile backhaul over such reused wire lines. As it is assumed that 80% of all radio traffic will be generated indoor, this is also where an increased densification of small cells, e.g. pico cells, will take place. FIG. 1 illustrates a scenario in a building 106, where Radio Base Stations (RBSs) 101a-c and 103a-c, serving small cells, are backhauled with ADSL2/ADSL2plus, VDSL2 or G.fast over reused wire lines 102a-b. RBSs 101b-c and 103b-c are not connected directly to wire lines 102a-b, but are connected via Gigabit Ethernet (GbE) connections. This type of connection of RBSs in series is referred to as that the RBSs 101b-c and 103b-c are "cascaded". The backhaul of the cascaded RBSs depend on the connection over wire line 102a and 102b, respectively. FIG. 1 further shows RBSs 104 and 105, which are connected to fiber backhaul links 106a-b. The different wire lines and cables providing backhaul links to the RBSs are connected to an aggregation node 107 for further communication with core network etc.

In the radio networks of today there are often redundant backhaul links between a Macro cell and a core network, which minimizes the risk of total service outage due to backhaul failure. However, in a heterogeneous network with an increased amount of small cells located indoors, which in many scenarios will reuse existing copper cables, it will not be possible to provide redundant backhaul links, and in the event of error on the backhaul the whole link will be affected. Furthermore, for heterogeneous deployment with small cells that are backhauled with VDSL2 or G.fast, the small cells will with high probability be placed in locations where the backhaul may be exposed to disturbances that could impact the backhaul performance.

When a backhaul link is exposed to interference, the result may be that the Signal to Noise Ratio on the backhaul link will decrease such that the configured bit rate cannot be maintained. There are three possible outcomes from this situation e.g. in a VDSL2 system:
1. Perform a Seamless Rate Adaptation, SRA, which enables to reduce the bit rate without a retrain. This process may take several seconds to be finished and requires negotiation between VDSL2 DSLAM and CPE.
2. Save Our Showtime, SOS, which is a mechanism where a reduction of rate is achieved through a flat reduction of the bit load over groups of tones. The SOS results, in general, in a bit rate which is far lower than what is achieved with SRA or Retrain. SOS may be used e.g. if the disturbance is so bad that an SRA will not be possible.
3. Perform a Retraining, where a lower rate corresponding to the reduced SNR on the line will be achieved. This would also disrupt the radio channel for the duration of the re-initialization of the backhaul.
   a. Vectored VDSL2 retrain of one line could take up to 20-90 seconds, if several lines need to be retrained, the startup time will be even longer.

The capacity of the backhaul link will thus either be zero (for a certain time period at retrain) or reduced to a lower number. This may cause serious problems to the users located in a cell, when these users are engaged in services which require that data is transmitted over the backhaul link. That is, the users in such a cell may suddenly have no, or at least a severely reduced, possibility to communicate with other entities via the backhaul link.

SUMMARY

In order to obviate and/or mitigate the above described problem related to the capacity of a backhaul link, it is suggested herein to adapt the load in a cell based on information on upcoming events related to a backhaul link. Further, the upcoming events related to the backhaul link may be delayed in order to give enough time for an RBS to complete activities related to the load adaptation. Thus, UEs may be handed over to neighboring cells proactively, before the cell becomes overloaded due to events related to the backhaul link.

According to a first aspect, a method is provided, which is to be performed by an RBS, the RBS being associated with communication over a wire line backhaul link, and further serving a number of UEs. The method comprises collecting (receiving or retrieving), information about the backhaul link from a backhaul communication entity. The method further comprises determining, based on said information, whether a procedure is about to be performed, which procedure entails that the capacity of the backhaul link will be reduced. Further, the method comprises estimating the capacity of the backhaul link after the forthcoming capacity reduction, and determining whether a traffic load of the RBS, exceeds said estimated backhaul link capacity, the traffic load being associated with the serving of UEs. The method further comprises reducing the traffic load associated with the serving of UEs in accordance with said estimated capacity of the backhaul link when the traffic load is determined to exceed the estimated backhaul link capacity after the forthcoming capacity reduction.

According to a second aspect, an RBS is provide, which is operable to communicate over a wire line backhaul link, and further operable to serve a number of UEs. The RBS comprises a collecting unit adapted to collect information about the backhaul link from a backhaul communication entity. The method further comprises a determining unit adapted to determine, based on said information, whether a procedure is about to be performed, which procedure entails that the capacity of the backhaul link will be reduced. Further, the RBS comprises an estimating unit adapted to estimate the capacity of the backhaul link after the forthcoming capacity reduction. Further, the determining unit, or another functional unit, is adapted to determine whether a traffic load of the RBS exceeds the estimated backhaul link capacity, the traffic load being associated with the serving of UEs. The RBS further comprises a control unit adapted to reduce the traffic load in accordance with the estimated capacity of the backhaul link when the traffic load is determined to exceed said estimated capacity of the backhaul link.

According to a third aspect, a method is provided, which is to be performed by a backhaul communication entity associated with a wire line backhaul link at an RBS. The method comprises receiving, from an aggregation node, an indication of a forthcoming procedure related to the backhaul link where the indication is to be acknowledged by the backhaul communication entity for the procedure to start. The method further comprises awaiting an indication from the RBS or the elapse of a certain type of predefined time period before acknowledging the indication of a forthcoming procedure, thus enabling the procedure to start.

According to a fourth aspect, a backhaul communication entity is provide, which is connectable to a wire line for backhaul link communication at an RBS. The backhaul communication entity comprises a receiving unit, adapted to receive, from an aggregation node, an indication of a forthcoming procedure related to the backhaul link, which indication is to be acknowledged by the backhaul communication entity for the procedure to start. The backhaul communication entity further comprises an acknowledgement unit, adapted to await an indication from the RBS and/or the elapse of a predefined time period before acknowledging the indication of a forthcoming procedure.

The above described methods and arrangements enable an RBS to adapt a traffic load associated with UEs served by the RBS to a forthcoming backhaul link capacity reduction caused by a procedure related to the backhaul link. The adaptation may thus be completed before the performing of the procedure takes place.

BRIEF DESCRIPTION OF DRAWINGS

The herein suggested technology will now be described in more detail by means of exemplifying embodiments and with reference to the accompanying drawings, in which:

FIG. 3a is a flow chart illustrating a procedure in a backhaul communication entity in association with an RBS, according to an exemplifying embodiment.

FIG. 3b is a flow chart illustrating a procedure in a backhaul communication entity in association with an aggregation node, according to an exemplifying embodiment.

DETAILED DESCRIPTION

The herein suggested technology involves use of prior information of coming retraining or other rate-reducing events related to the backhaul link to decide to reduce a cell load, e.g. by triggering handover.

Handover at Re-Initialization of the Backhaul Link

Figure 4:
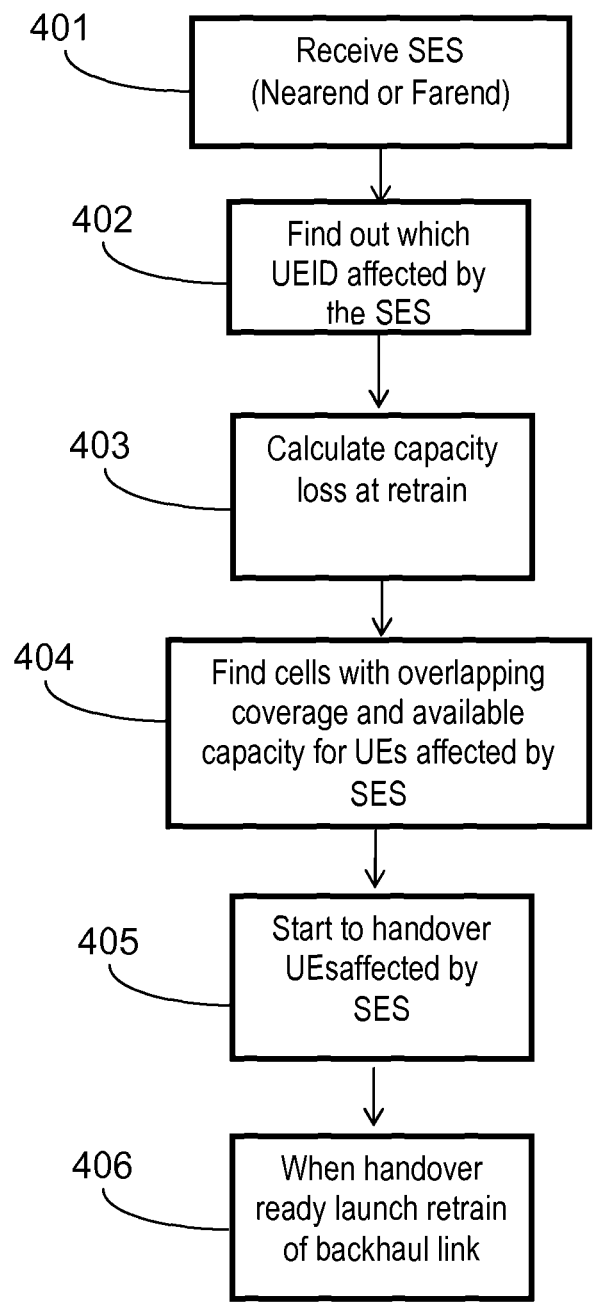
FIGS. 4 and 5 are schematic flow charts illustrating procedures related to a retraining procedure (FIG. 4) and an SRA or SOS procedure (FIG. 5), according to exemplifying embodiments.

If noise or some other deterioration on the line results in an SNR reduction, such that neither coding nor retransmission can correct the errors in information received over the line, the result will be bit errors, which are typically indicated by Cyclic Redundancy Check (CRC) errors. Such CRC errors are also known as code violations (CV). According to standard procedure, if the number of CRC errors during a second is more than 18, a "Severly Errored Second" (SES) will be declared, and after 10 SESs, or some other number of SESs configured over the management interface, the line will retrain. According to an exemplifying embodiment of the mechanism proposed herein, as soon as the SES is declared, this signal should be forwarded e.g. to a Radio traffic control entity, such as an RBS, which immediately should initiate handover of the users which would be impacted by the retrain. The flow diagram in FIG. 4 shows such a suggested operation Handover at Reduced Rate on the Backhaul If, for example, the noise increases on the wire line used for the backhaul, such that the configured rate cannot be maintained, the modem, i.e. a backhaul communication entity, will make an OLR (On-Line Reconfiguration) and reduce the rate through SRA or SOS. If the noise increases slowly, an SRA can be used to accommodate the needed reduction in bit rate. The procedure of the SRA is that if the SNR margin goes below a certain value for a certain time, an SRA is requested from the receiver (i.e. either side/end of the backhaul link, depending on upstream or downstream) where the objective is to reduce the rate so that the SNR margin can be restored. The receiver will propose a new reduced bit rate and bit loading, together with changes of some of the necessary framing parameters. The transmitter (i.e. the other side/end of the backhaul link, as compared to the mentioned receiver) will acknowledge or reject the SRA request. If the request is acknowledged, then, after a certain number of data symbols, the bit rate change will take place. Prior to the SRA, the drop in SNR margin will result e.g. in an increase of the FEC-counters (Forward Error Correction) and retransmission requests and maybe even CRC (Cyclic Redundancy Check) errors. Such parameters are sometimes referred to as performance primitives in the context of DSL communication. Such performance primitives can be monitored and be forwarded or made available to a Radio traffic control entity, such as an RBS, which can combine the monitored parameters and decide that an SRA is expected and therefore start handing over users to another cell in order to adapt to, or "balance", the forthcoming change in the backhaul link capacity. Possibly, an additional function or entity may be provided and applied, which may process the information related to the backhaul link communication before it reaches the Radio traffic control entity. For example, such an additional function could reduce, aggregate, convert and/or translate the information that goes to the Radio traffic control entity, such that the Radio traffic control entity does not need to know specific details about the communication protocol used, e.g. VDSL2 or G.fast. Such an additional functionality could be present in all embodiments described herein When a VDSL2 system used for mobile backhaul experiences increased noise and have to retrain or make an OLR, such as an SRA or SOS in order to reduce the rate on the line, this information should be forwarded or made available to the RBS such that the RBS can initiate a handover to cells with overlapping coverage such that a number of users can be moved to other cells in order to secure that the impacted users can maintain access or to balance the change in provided capacity for the cell when the backhaul capacity is reduced. Candidate target cells, to which a hand over possibly could be made are typically kept in a so-called cell neighbor relation list in the RBS which is continuously updated through measurement reports received from the UEs. Particularly in the event of retrain of the backhaul link (VDSL2 retrain), as many as possible of the affected user should be handed over to other cells before the retrain is allowed to take place, given that it is possible to maintain synchronization of the DSL link and get data related to the handover to be correctly received.

Figure 2:
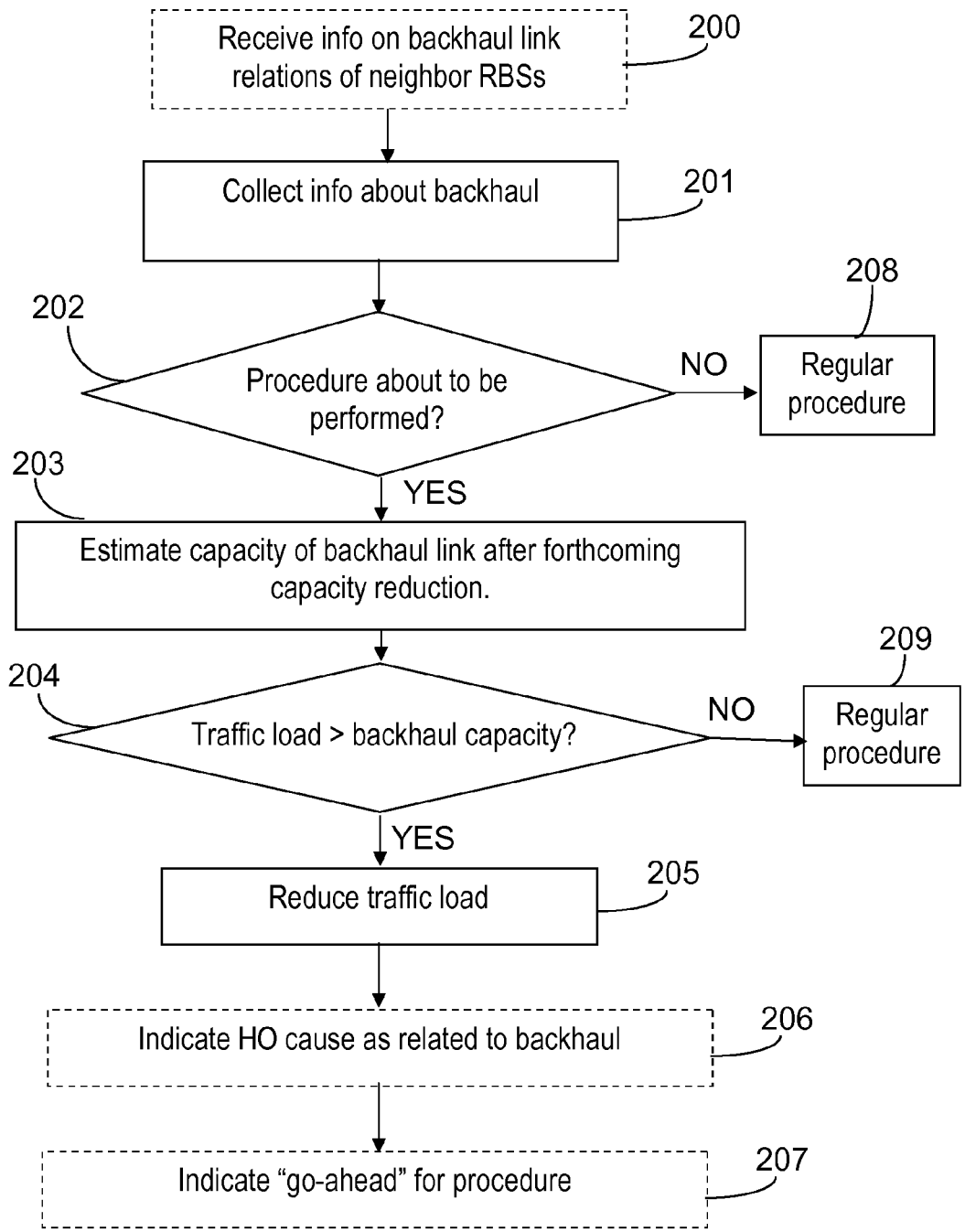
FIG. 2 is a flow chart illustrating a procedure in an RBS according to an exemplifying embodiment.

Exemplifying Procedure in RBS, FIG. 2

A procedure in an RBS is illustrated in FIG. 2. The RBS is assumed to be associated with communication over a wire line backhaul link, and further to serve a number of UEs in one or more cells. Information to and from the UEs is transported over an air interface and also over the backhaul link. In a specific embodiment, the RBS serves a small cell, such as a so-called pico or femto cell, in an indoor environment, and the wire line is a reused cable, such as telephone graded copper cables, CAT3 or CAT5.

Information about the backhaul link is collected from a backhaul communication entity in an action 201. By "collecting" is here meant e.g. polling the backhaul communication entity for information, thus retrieving information therefrom. Alternatively, collecting may refer to receiving information provided by the backhaul communication entity 703, such as e.g. alert signals provided when a procedure is to be performed. The information may be processed before reaching the RBS functionality 701, as previously described. For example, it could be converted to a format which is understandable to the RBS functionality 701.

The in an action 202, based on said information, whether a procedure related to the backhaul communication entity 703 is here illustrated as an integrated part of the RBS, and could also be denoted CPE (Customer Premises Equipment) in analogy with traditional DSL terminology. The backhaul communication entity 703 could alternatively be separate from the RBS and be connected to the RBS. The formulation that the backhaul communication entity 703 is connectable to a wire line at an RBS is considered to cover both the alternative that the entity 703 is integrated with the RBS and the alternative that the entity 703 is a separate unit as compared to the RBS, but is connected (connectable) to the RBS. That is, the backhaul communication entity 703 is located at the RBS side of the backhaul link, but is not necessarily an integrated part of the RBS.

Then, it is determined backhaul link is about to be performed, which procedure entails that the capacity of the backhaul link will be reduced. The information could comprise any performance primitives available e.g. in the protocol used for communication over the backhaul link, and/or explicit indications or requests related to retraining, SRA or SOS or similar.

The capacity of the backhaul link after the forthcoming capacity reduction is estimated in an action 203. This capacity may be estimated based on the collected information and depend, e.g. on the type of procedure that is to be performed. The type of procedure could be e.g. retraining, SRA or SOS. The RBS has a certain traffic load associated with the served UEs. The transport of data associated with this traffic load over the backhaul link requires a certain capacity over the backhaul link. In order to know whether one or more of the served UEs will be affected by the forthcoming capacity reduction on the backhaul link, it is determined in an action 204, whether the traffic load of the RBS will exceed the estimated backhaul link capacity after the capacity reduction. It could e.g. be determined how much backhaul link capacity that will be missing, in relation to the (current) traffic load, after the forthcoming capacity reduction. When the traffic load is determined to exceed the estimated backhaul link capacity after the forthcoming capacity reduction, the traffic load associated with the serving of UEs is reduced in accordance with the estimated backhaul link capacity after the forthcoming capacity reduction in an action 205. That is, the traffic load is reduced such that the estimated reduced capacity over the backhaul link will be sufficient for transport of data associated with the reduced traffic load.

The capacity reduction may be achieved by handing over as many UEs as required in order to lower the traffic load to match the estimated reduced backhaul link capacity. When one or more UEs are handed over based on a forthcoming procedure associated with the backhaul link, the handover cause could be set to indicate that the handover is related to the backhaul link. This is illustrated as action 206 in FIG. 2. Further, when a reduction of the load is completed, or, in some cases, at least initiated, an indication may be sent to a backhaul communication entity in an action 207. Such an indication could be configured to be interpreted as a "go-ahead"-signal for the procedure related to the backhaul link, which is about to be performed.

Figure 1:
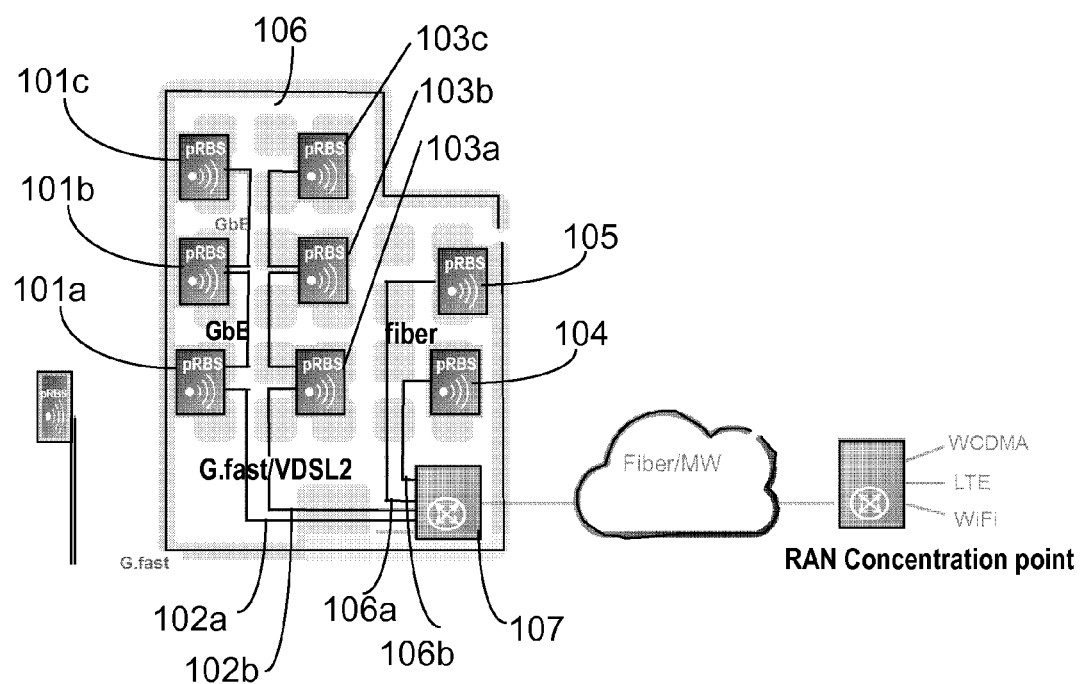
FIG. 1 illustrates RBSs in a building, being backhauled via reused wire lines.

The UEs should preferably be handed over to neighboring cells which are not affected by the procedure related to the backhaul link, in the sense that these neighboring cells will have enough capacity to serve the UEs handed over to them also after the backhaul link capacity reduction. For example, a cell served by an RBS which is "cascaded" in relation to the RBS which is about to reduce its load, will also be affected by a capacity reduction on the backhaul link, cf. FIG. 1. Therefore, it may be de desired to avoid attempts to hand over UEs to cells (and thus RBSs) which depend on the backhaul link in question. This could be achieved e.g. by that information related to backhaul link relations of neighboring RBSs is provided to the RBS, and is received by the RBS e.g. in an action 200. For example, the information may comprise indicators of neighboring cells and/or neighboring RBSs that are cascaded in relation to the RBS. Thus, a candidate target cell (and thus a candidate target RBS), which is independent of the capacity over the backhaul link in question, could be determined out of a set of neighboring RBSs, e.g. in the neighbor cell list. At least one UE of the number of UEs may then be handed over to the determined candidate target cell. For example, in order to enable such functionality, the Automatic neighbor cell relation list defined in ETSI TS 136 300 V8.12.0 section 22.3.2a could be amended with a field connected to the Target Cell Identifier (TCI) so that it is indicated that there is a dependence to this specific cell. Such a dependency could be that if the backhaul link of a current serving cell is broken, this neighbor cell will also lose its backhaul connection, the neighbor cell therefore not being a suitable target cell in situations related to reduced capacity on the backhaul link of a current serving cell.

Naturally, this determined target cell may be fully loaded, or reject a request for handover for other reasons, just as in any regular case of hand over, irrespective of handover cause. This, however, may be assumed to be handled in accordance with regular hand over protocols. If there is no suitable neighbor cell which may take over load from an RBS, which is about to adapt to a reduced backhaul capacity, one or more UEs or bearers will be dropped.

Figure 6:
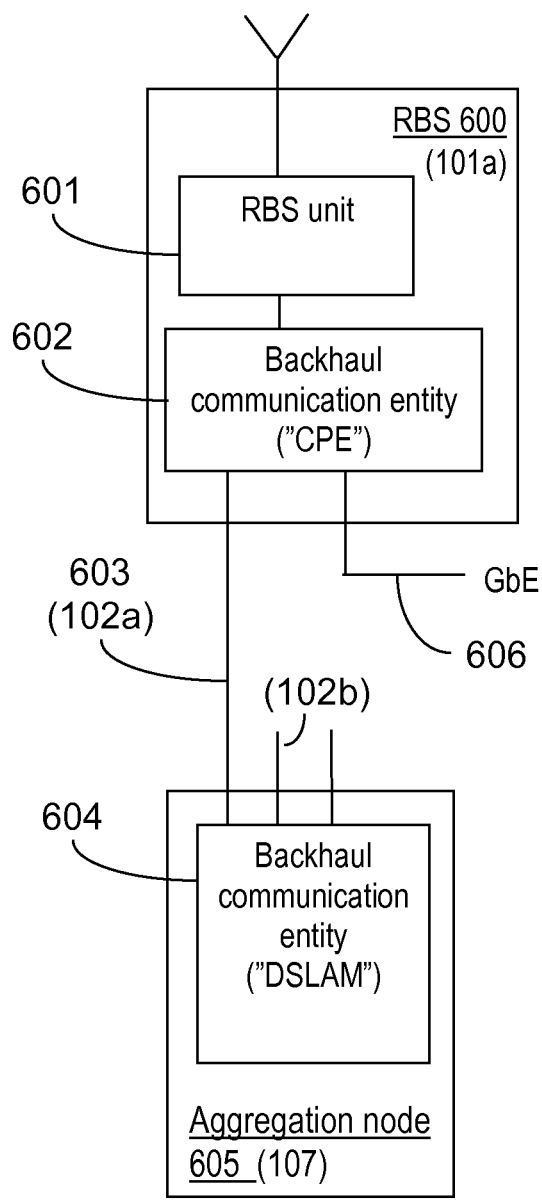
FIG. 6 is a schematic block diagram illustrating an RBS connected to an aggregation node via a wire line.
Figure 7A:
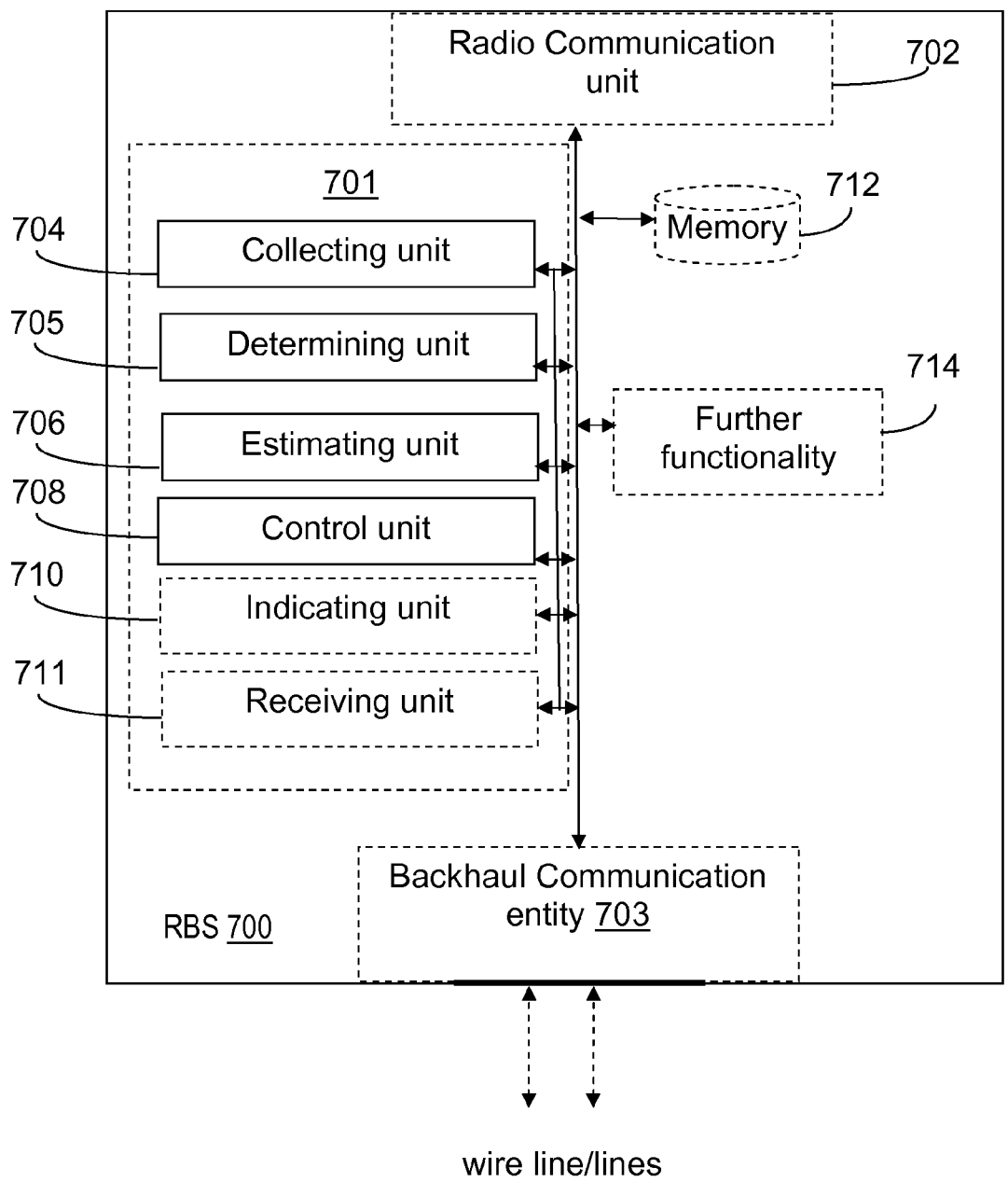
FIGS. 7a and 7b are block diagrams illustrating functionality in an RBS according to exemplifying embodiments.
Figure 7B:
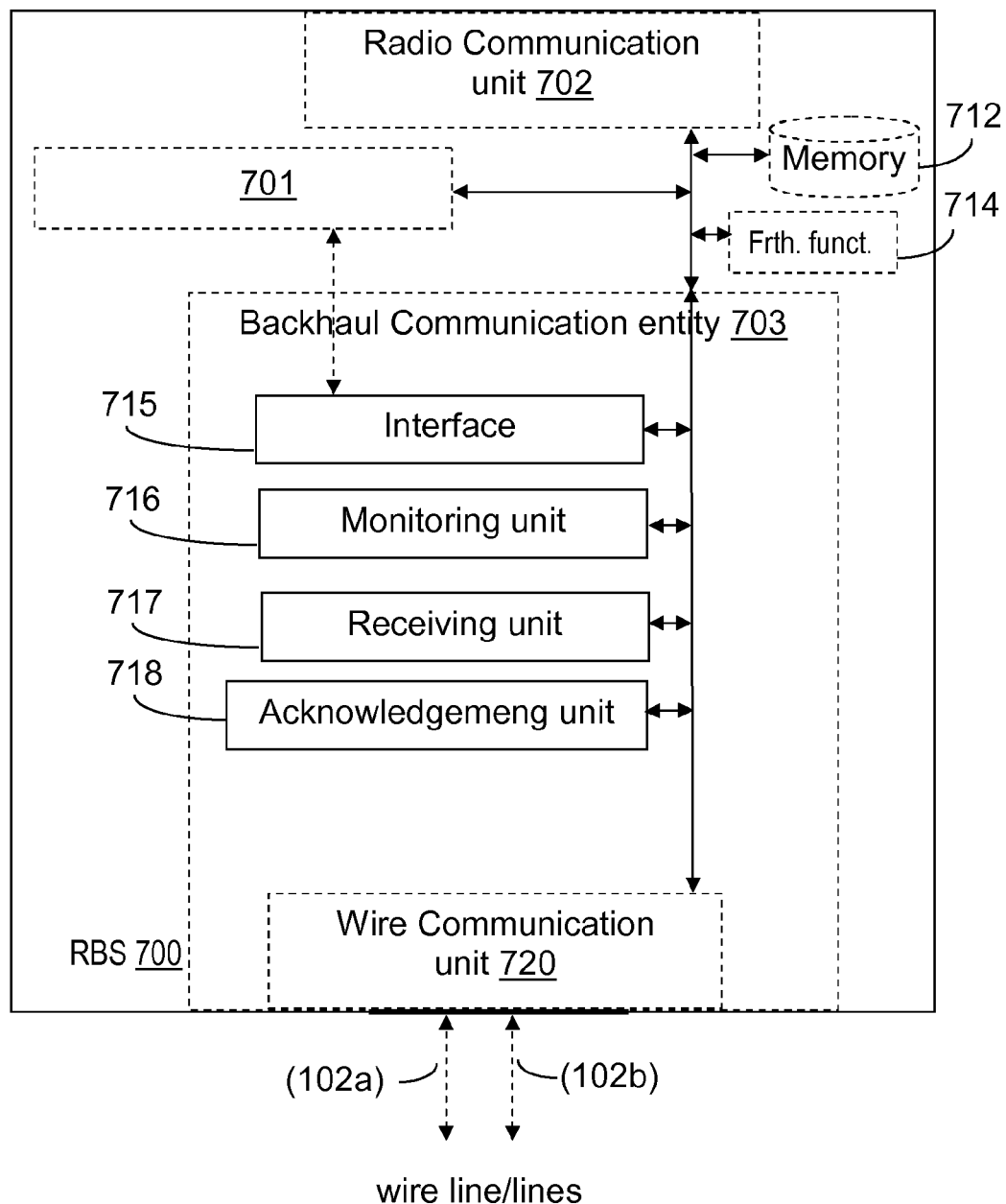
Figure 8:
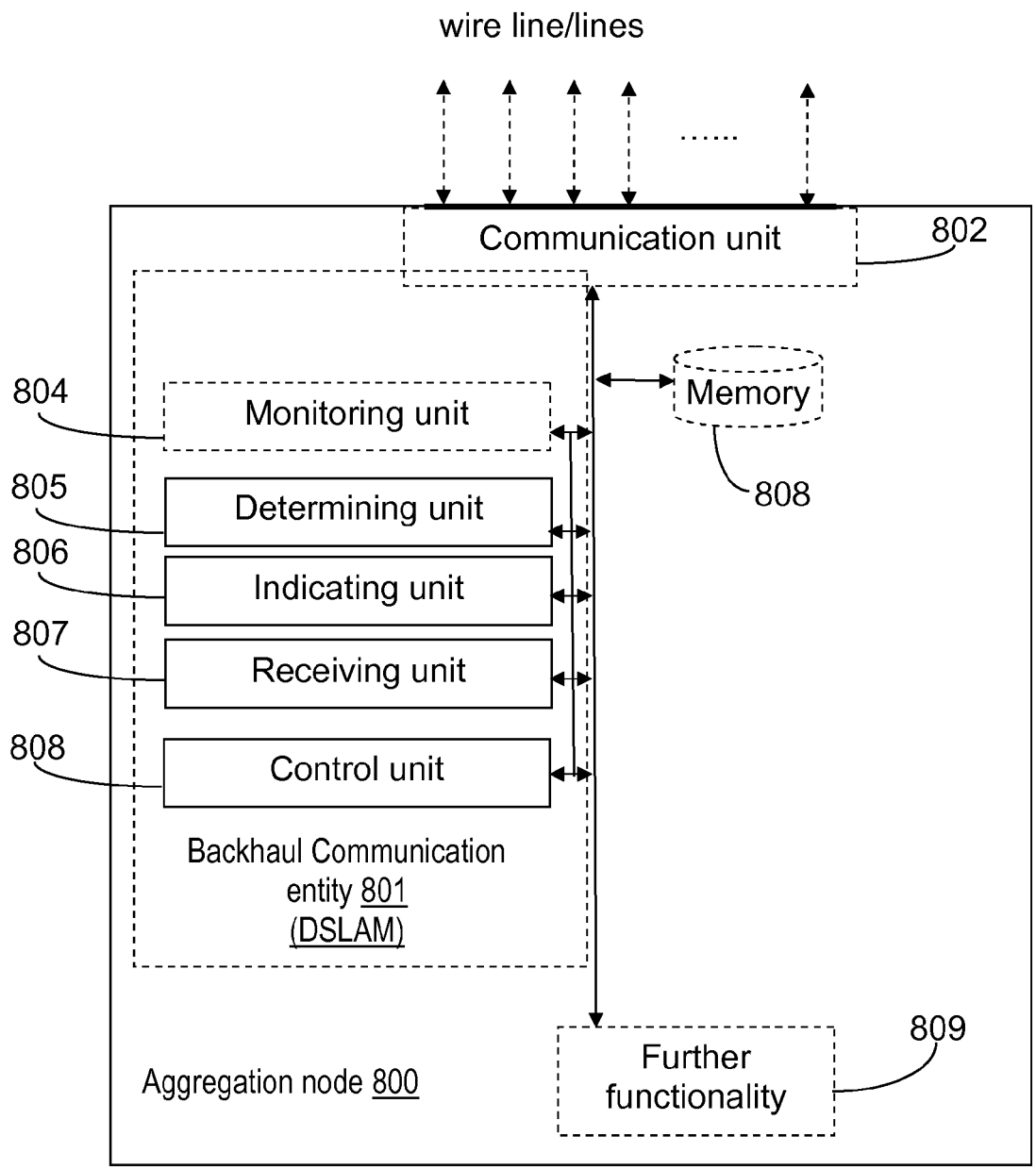
FIG. 8 is a block diagram illustrating functionality in an aggregation node according to an exemplifying embodiment.

Herein, the term "backhaul communication entity" could either refer to an entity located in association with an RBS, cf. 602 in FIGS. 6 and 703 in FIG. 7*a-b*, or, to an entity located in association with an aggregation node, cf 604 in FIGS. 6 and 801 in FIG. 8. The backhaul communication entity located in association with the RBS, e.g. integrated with the RBS, could also be referred to as CPE (Customer Premises equipment). The backhaul communication entity located in association with the aggregation node could also be referred to as DSLAM (Digital Subscriber Line Access Multiplexer), in order to clarify the different functions and locations of said backhaul communication entities.

A procedure, such as retraining or SRA, when initiated due to interference on the backhaul link, is initiated by the receiving backhaul communication entity. That is, for the downstream case, related to information sent from the aggregation node to the RBS, such procedures are initiated by the backhaul communication entity (CPE) located in association with the RBS. For the upstream case, related to information sent from the RBS to the aggregation node, such procedures are initiated by the backhaul communication entity (DSLAM) located in association with the aggregation node.

A retraining procedure may alternatively be performed on the initiative of a management node, e.g. in a higher hierarchical layer or level in the communication system. Such a retraining may be initiated by a management node e.g. after a software and/or hardware upgrade or some other maintenance process, in order to retrain the backhaul link in accordance with new circumstances.

Exemplifying Procedure in Backhaul Communication Entity, FIG. 3*a-b*

A procedure in a backhaul communication entity will be described below with reference to FIGS. 3*a* and 3*b*. FIG. 3*a* illustrates an exemplifying method in the backhaul communication entity (CPE) located in association with the RBS. It is determined in an action 301*a* whether a procedure, such as retraining, SRA or SOS, is to be performed. This may be determined e.g. based on the quality of downstream communication (indicating a need), or based on an indication received from a backhaul communication entity (DSLAM) in an aggregation node, as previously described. At least in the case when a retraining is initiated from the aggregation node, the backhaul communication entity (DSLAM) will indicate to the backhaul communication entity (CPE) that a retraining is to be performed, and then wait for an acknowledgement from the backhaul communication entity (CPE) before starting the retraining. Information related to the upcoming procedure is assumed to be made available to an RBS functionality in the RBS. This may also be described as that the DSLAM indicates to the RBS that a retraining is to be performed, and that the DSLAM then waits for an acknowledgement from the RBS before starting the retraining (even though there will be some type of CPE functionality involved in conveying information between the DSLAM and the RBS functionality).

When it has been determined in action 301*a* that a retrain is to be performed, the backhaul communication entity (CPE) waits for an indication from the RBS unit (cf 601, 701), indicating that the RBS has prepared for the forthcoming loss of capacity, and thus indicating that the retrain may be initiated. Alternatively, the backhaul communication entity (CPE) waits for a predefined time period, e.g. from the receiving of an indication related to retraining from the aggregation node, until acknowledging, or otherwise enabling a launch of a retraining. The predefined time period should preferably be configured such that the RBS will have enough time to adapt the load to the forthcoming capacity reduction. For example, the time it takes for an RBS to hand over a number of UEs to neighboring cells could be estimated, e.g. by simulations or based on real cases, and the predefined time period could be set based on said time estimate. This awaiting of an indication from the RBS unit/functionality or the awaiting of an elapse of a predefined time period enables the RBS to prepare for the retraining, e.g. by handing over all served UEs to neighboring RBSs, before the retraining takes place, which obviates e.g. interrupted service of UEs.

When such an indication from the RBS functionality is received, and/or, when such a predefined time period has elapsed in an action 302*a*, the retrain is acknowledged to the backhaul communication entity (DSLAM) in an action 303*a*, where after the retraining is performed, which is illustrated as an action 304*a*. By "acknowledge" is here meant either accepting a request or indication of retraining from the backhaul communication entity (DSLAM), or, otherwise indicating to the backhaul communication entity (DSLAM) that a retraining is needed, thus initiating the retraining (without a foregoing indication of retraining from the DSLAM). When the procedure to be performed is not associated with retraining, i.e. does not involve retraining, but being associated with OLR, such as e.g. SRA or SOS, there may be no need for delaying the procedure, at least not until the load adaptation is fully completed, since the capacity over the backhaul link will not be reduced to zero, and may still allow for e.g. remaining hand over signalling. However, if desired, the actions described above including waiting until a (proactive) handover is completed could be applied also for OLR cases, such as SRA or SOS.

FIG. 3*b* illustrates a procedure in a backhaul communication entity (DSLAM), i.e. a backhaul communication entity located in an aggregation node, cf. 604 in FIG. 6. It is determined in an action 301*b* whether a procedure, such as retraining, SRA or SOS, is to be performed. This may be determined e.g. based on the quality of upstream communication, i.e. based on a detected need, or based on an indication from a backhaul communication entity (CPE) in an RBS. In case it is determined that a retraining is to be performed, the backhaul communication entity (DSLAM) will indicate to the backhaul communication entity (CPE) that a retraining is to be performed, and then wait for an acknowledgement or "go-ahead" from the backhaul communication entity (CPE) before starting the retraining. The arrival of this acknowledgement will depend on or be based on activities of an RBS unit, as previously described. When the acknowledgement is received in an action 302*b*, the retraining is performed, which is illustrated as action 303*b*. A similar procedure is possible also for other capacity-reducing procedures, such as SRA and SOS. That is, the backhaul communication entity (DSLAM) may indicate to the backhaul communication entity (CPE) that e.g. an OLR such as an SRA or SOS is to be performed, and then wait for an acknowledgement or "go-ahead" from the backhaul communication entity (CPE) before starting the SRA or SOS. However, if data is seriously corrupted on the backhaul link, the necessary data sent from source to target cell in order to establish a hand over may be lost. In such cases a handover may need to be finished after the SRA or SOS.

For example, within VDSL2, there are so-called "Non-standard Facility commands and responses" available, which can be used to transmit proprietary messages between DSLAM and CPE. This means that a proprietary retrain request could be sent from the DSLAM to the CPE (possibly given that DSLAM and CPE are of the same make or vendor). The CPE responds with an "ack-signal", which then could be sent when handover is completed. Another option is that the DSLAM sends an L3 request, which is the deactivate request command, the CPE can then either grant or reject this request. The CPE could send a grant after handover is done and when the DSLAM receives the grant, it can immediately deactivate and wait for the CPE to complete the deactivation, listen for the handshake tones from the CPE, respond and start a new initialization.

FIG. 4 illustrates a schematic exemplifying procedure from a system perspective when the procedure to be performed is retraining. In this exemplifying procedure, a Severely Errored Second, SES, or an indication thereof, is received in an action 401. This action may take place in a backhaul communication entity at the "CPE"-side or the "DSLAM"-side of the backhaul link. The receiving of the SES will, in this example, trigger a retraining of the backhaul link. The information about the SES and/or that a retraining/SRA/SOS is to be performed is provided or made available to an RBS. The RBS determines, in an action 402, which UEs, e.g. in form of UEIDs, that will be affected by the retraining, etc. The RBS calculates the capacity loss at retraining in an action 403. That is, the RBS determines e.g. how much load that will need to be transferred to neighboring cells, in order to adapt to a reduced capacity associated with the retraining. The RBS determines, in an action 404, whether there are any neighboring cells with overlapping coverage, to which load (which would be excess load during/after the procedure) can be transferred. If there are suitable neighboring cells, the RBS hands over affected UEs in an action 405, and when the hand over is secured, the retraining may be launched in an action 406. The performing of the retraining may be triggered e.g. by a time out or an explicit indication from the RBS. In the case of a retrain, all capacity will be lost over the backhaul link during the retraining, and therefore all UEs in need of a functioning backhaul link will need to be handed over or otherwise removed from the cell in order not to lose service. However, in the case of OLR, such as SRA or SOS, there will still be some capacity over the backhaul link.

Figure 5:
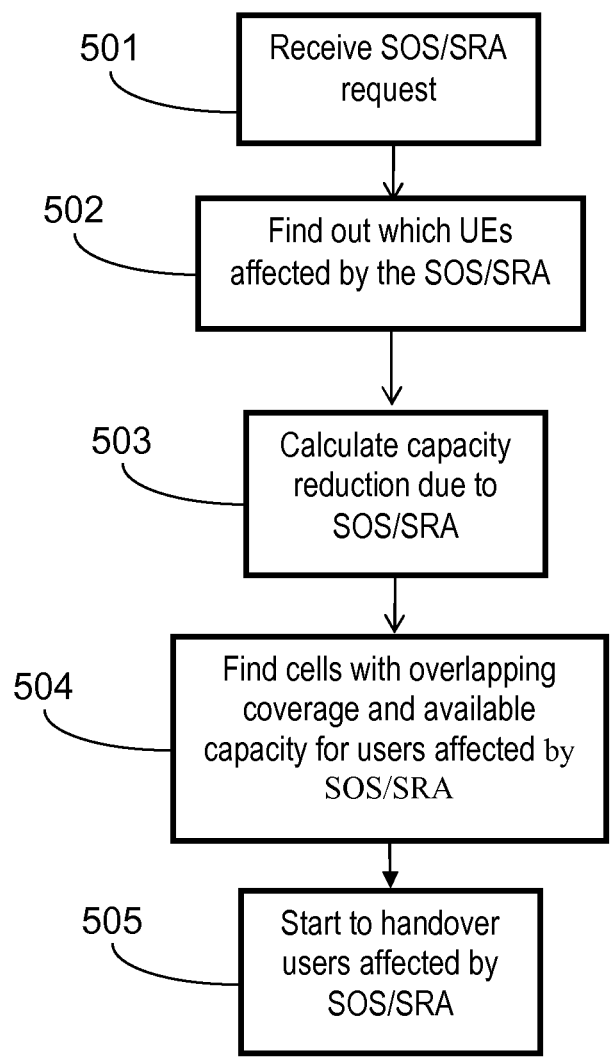

FIG. 5 illustrates a schematic exemplifying procedure from a system perspective when the procedure to be performed is an OLR procedure, such as an SOS or SRA or similar. In this exemplifying procedure, a request for an SOS or SRA (OLR) is received in an action 501. This action may take place in a backhaul communication entity at the "CPE"-side or the "DSLAM"-side of the backhaul link, depending on which side that experiences the need for initiating a procedure like SOS or SRA. Information about the request and/or that an SRA or SOS is to be performed, is provided or made available to an RBS functionality, cf. RBS unit 601 in FIG. 6. The RBS determines, in an action 502, which UEs, e.g. in form of UEIDs, that will be affected by the SOS or SRA procedure. The RBS calculates the capacity loss due to the performing of an SOS or SRA in an action 503. That is, the RBS determines e.g. how much of the present load that will need to be transferred to neighboring cells, in order to adapt to a reduced capacity associated with the SOS or SRA. The RBS determines, in an action 504, e.g. based on information in an automatic neighbor relation list, whether there are any neighboring cells with overlapping coverage, to which load (which would be excess load after the procedure) can be transferred. If there are suitable neighboring cells, the RBS starts to hand over affected UEs in an action 505. In this case, the performing of the procedure (SOS/SRA) may be initiated before the handover is secured or completed, since there will be at least some transmission capacity on the backhaul link also during and after the procedure. That is, in case of SRA or SOS or similar procedures, the launching of the procedure may not need to be delayed until the transfer of load to neighboring RBSs is secured or completed, as in the case of retraining described above.

FIG. 6 illustrates an RBS 600 and an aggregation node 605, which are connected via a wire backhaul link 603. In a specific embodiment, the wire backhaul link is a reused cable, such as a telephone copper cable. The RBS 600 comprises an RBS unit 601 for performing RBS-related functions, such as communicating with UEs over an air interface. The RBS unit 601 comprises means for wireless communication and means for performing a method previously described in conjunction with FIG. 2. The RBS 600 further comprises a backhaul communication entity 602, for communication over the wire backhaul link. The backhaul communication entity 602 comprises means for wire line communication according to a protocol, such as ADSL2/ADSL2plus, VDSL2 or G.fast. The entity 602 is also indicated as "CPE" in order to illustrate that it is the side of the backhaul link corresponding to the customer premises, and not the aggregation node side. The backhaul communication entity 602 may further be operable to communicate e.g. with cascaded RBSs via GbE e.g. over a wire connection 606.

The aggregation node 605 in its turn also comprises a backhaul communication entity 604 (not identical to 602). The backhaul communication entity 604 comprises means for communicating over wire lines according to a protocol, such as ADSL2/ADSL2plus, VDSL2 or G.fast, and is operable to communicate with the backhaul communication entity 602 in RBS 600. A procedure, such as retraining, SOS or SRA may be initiated by either of the backhaul entities 602 and 604, in accordance with the protocol used for communication.

Below, an exemplifying RBS 700, adapted to enable the performance of at least one of the above described procedures will be described with reference to FIGS. 7a and 7b. The RBS 701 is operable to serve one or more UEs in a cell associated with the RBS. FIG. 7a illustrates an exemplifying embodiment of an RBS 700, which could be an implementation of the RBS 600 in FIG. 6.

The RBS 700 is illustrated as to communicate with UEs via a radio communication unit 702, which may be considered to comprise means for wireless uplink and downlink communication. Parts of the RBS which are adapted to enable the performance of at least part of one of the above described procedures are illustrated as an arrangement 701, surrounded by a broken line. This arrangement could be regarded e.g. as part of an "RBS unit", such as the unit 601 in FIG. 6. The RBS may further comprise other functional units 714, for providing e.g. regular RBS functions, such as e.g. scheduling and other serving of UEs. The arrangement and/or RBS may further comprise one or more storage units 712.

The arrangement 701 could be implemented by processing circuitry, e.g. by one or more of: a processor or a micro processor and adequate software and storage therefore, a Programmable Logic Device (PLD) or other electronic component(s)/processing circuit(s) configured to perform the actions mentioned above e.g. in conjunction with FIG. 2.

The RBS 700 further comprises a backhaul communication entity 703. This entity is illustrated as an integrated part of the RBS, but could alternatively be located outside the RBS 700, as a separate entity connected to the RBS. The backhaul communication entity 703 comprises means for communication over at least one wire line according to a communication protocol. The backhaul communication entity 703 is assumed to have an interface through which other units may access information related to the status and/or conditions of the backhaul link. Alternatively or in addition, the backhaul communication entity 703 may be arranged to provide information related to the status and/or conditions of the backhaul link to other units, such as the collecting unit 704. The information may be transformed or processed to a format suitable for further processing within the arrangement 701, as previously described.

The arrangement 701 may be implemented and/or described as follows: The arrangement 701 comprises a collecting unit 704, adapted to collect information about the backhaul link from the backhaul communication entity 703. By "collecting" is here meant e.g. polling the backhaul communication entity 703 for information, thus retrieving information therefrom. Alternatively, collecting may refer to receiving information provided by the backhaul communication entity 703, such as e.g. alert signals provided when a procedure is to be performed.

The arrangement 701 further comprises a determining unit 705, adapted to determine, based on said information, whether a procedure associated with the backhaul link is about to be performed, which entails that the capacity of the backhaul link will be reduced. The arrangement 701 further comprises an estimating unit 706, adapted to estimate, e.g. based on said information, the capacity of the backhaul link after the forthcoming capacity reduction. The determining unit 705 is further adapted to determine whether a traffic load of the RBS will exceed the estimated backhaul link capacity after the forthcoming capacity reduction, where the traffic load is associated with the serving of UEs. The arrangement 700 further comprises a control unit 708, adapted to reduce the traffic load associated with serving of UEs, in accordance with the estimated backhaul link capacity after the forthcoming capacity reduction. That is, if it is determined that the load of the RBS would exceed the estimated capacity after the forthcoming capacity reduction with X units, the load should be reduced by at least X units. The load may be reduced, at least partly, by that UEs are handed over to neighboring RBSs, as previously described.

The arrangement and/or other parts of the RBS may further be adapted to determine whether neighboring nodes, being candidates for taking over part of the load from the RBS, depend on the same backhaul link as the RBS. Thus, it may be determined whether these neighboring RBSs also will be affected by the capacity-reducing procedure on the backhaul link, and thus may be unsuitable as receivers of load from the RBS. For example, the RBS could be provided with information about backhaul link relations of neighboring RBSs, such as e.g. cascaded RBSs. Then, a target RBS out of a set of neighboring RBSs may be determined, at least partly based on this information, to which at least one UE of the number of UEs is to be handed over. The arrangement 701 could e.g. comprise a receiving unit 711, adapted to receive information related to backhaul link relations of neighboring RBSs, e.g. from a control node in the communication system. Such information may be provided to the RBS e.g. at setup of the RBS or any of the neighboring RBSs, or upon request. Further, for example, as previously described, the Automatic neighbor cell relation list defined in ETSI TS 136 300 V8.12.0 section 22.3.2a could be amended with a field connected to the Target Cell Identifier (TCI) indicating that there is a backhaul link dependency to this specific cell, the cell therefore not being a suitable target cell in situations related to reduced capacity on the backhaul link of a current serving cell.

When a handover is performed, a parameter denoted "handover cause", or similar, should be set. This is done in order to be able to track and analyze the different reasons for hand over in a communication system. Thus, a new handover cause indication is needed, which indicates that the handover is related to the performance of the backhaul link. There is no such hand over cause indication today.

The arrangement 701 may further comprise an indicating unit 710, adapted to, when the traffic load is reduced, indicate to the backhaul communication entity that the traffic load has been reduced in accordance with the estimated capacity of the backhaul link, thus indicating that the procedure entailing reduced backhaul link capacity may be started. In accordance, the backhaul communication entity 703 should be adapted to wait for the indication before starting, or "launching" the procedure. The starting or launching could involve e.g. acknowledgement of a request for retraining from an aggregation node, as previously described.

In FIG. 7b, an exemplifying implementation of the backhaul communication entity 703 is shown in more detail. The backhaul communication entity 703 is connected to one or more wire lines for providing backhaul link communication to the RBS 700. The backhaul communication entity 703 is illustrated as to communicate over the backhaul link via a wire communication unit 720, which may be considered to comprise means for wire line upstream and downstream communication. The backhaul communication entity 703 is further connected to the RBS unit 701 and in this example also to other parts of the RBS 700.

The backhaul communication entity 703 comprises a receiving unit 717, adapted to receive an indication of an upcoming retraining from an aggregation node. The received indication is to be acknowledged by the backhaul communication entity 703 in order for the retraining to start. The information that a retraining is to be performed is made available to the RBS unit 701, e.g. via an interface 715. The information may be collected by the RBS unit, as previously described. That is, the RBS unit can request the information from the backhaul communication entity, and/or the information can be provided to the RBS unit by the backhaul communication unit. Further, the information may be transformed or otherwise processed, e.g. into a format which is understood by the RBS unit.

The backhaul communication entity 703 further comprises an acknowledgement unit 718, adapted to await an indication from the RBS and/or the elapse of a predefined time period associated with activities of the RBS, before acknowledging the indication of an upcoming retraining to the aggregation node. When an indication from the RBS is received, and/or, a certain predefined time period has elapsed e.g. from the receiving of the indication from the aggregation node, said indication is acknowledged to the aggregation node. Such a predefined time period should be selected based on a time it is estimated to take for an RBS to adapt the load on the RBS to an upcoming capacity reduction on the backhaul link. The indication from the RBS may indicate that a load adaptation related to the upcoming retraining is initiated, secured and/or completed.

The backhaul communication entity 703 may further be implemented as to comprise a monitoring unit 716, adapted to monitor the backhaul link and indications from the aggregation node, and to make any information related to that a procedure is about to be performed, which procedure entails a reduction of the capacity on the backhaul link, available to the RBS unit, e.g. via the interface 715.

FIG. 8 illustrates an aggregation node 800, connectable to a wire line backhaul link to an RBS. The aggregation node 800 is operable to communicate, over wire lines, with a number of nodes using a protocol such as e.g. ADSL2/ADSL2plus, VDSL2 or G.fast. FIG. 8 illustrates an exemplifying embodiment of an aggregation node 800, which could be an implementation of the aggregation node 605 illustrated in FIG. 6.

The aggregation node 800 is illustrated as to communicate over the wire lines via a communication unit 802, which may be considered to comprise means for upstream and downstream communication over wire lines. Parts of the aggregation node which are adapted to enable the performance of at least part of one of the above described procedures are illustrated as an arrangement 801, surrounded by a broken line. The aggregation node may further comprise other functional units 809, for providing e.g. regular aggregation node functions, such as e.g. communication with a core network via another communication protocol. The arrangement and/or aggregation node may further comprise one or more storage units 808.

The arrangement 801 could be implemented by processing circuitry, e.g. by one or more of: a processor or a microprocessor and adequate software and storage therefore, a Programmable Logic Device (PLD) or other electronic component(s)/processing circuit(s) configured to perform the actions mentioned above.

The aggregation node comprises a determining unit 805, adapted to determine whether a procedure, such as retraining, SRA or SOS, related to the backhaul link is to be performed. The aggregation node further comprises an indicating unit 806, adapted to, when it is determined that such a procedure is to be performed, indicate to the RBS that a certain type of procedure is to be performed. The aggregation node further comprises a receiving unit 807, adapted to await an acknowledgement of the indication from the RBS. The waiting time will depend on load adaptation activities of the RBS. The aggregation node further comprises a control unit 808, adapted to, when an acknowledgement is received from the RBS, start the procedure related to the backhaul link.

Figure 9:
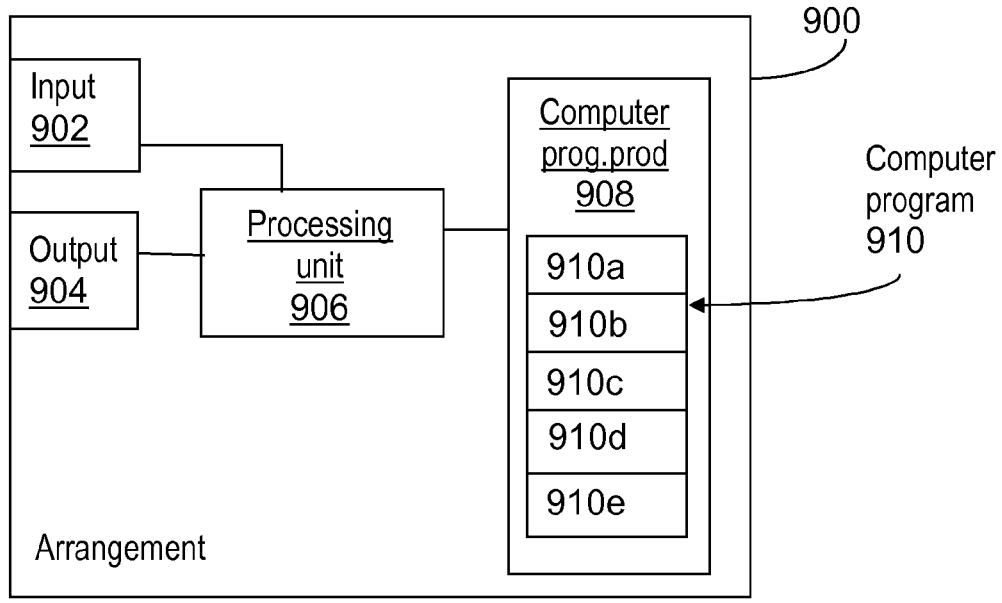
FIGS. 9 and 10 are block diagrams illustrating arrangements according to exemplifying embodiments.

FIG. 9 schematically shows an embodiment of an arrangement 900 for use e.g. in an RBS. The arrangement 900 could be an alternative way of implementing an embodiment of the arrangement 701 in an RBS illustrated in FIG. 7a. Alternatively, the arrangement 900 may be an embodiment of the whole or part of the RBS 700 illustrated in FIGS. 7a and 7b. Comprised in the arrangement 900 are here a processing unit 906, e.g. with a DSP (Digital Signal Processor). The processing unit 906 may be a single unit or a plurality of units to perform different actions of procedures described herein. The arrangement 900 may also comprise an input unit 902 for receiving signals from other entities, and an output unit 904 for providing signal(s) to other entities. The input unit 902 and the output unit 904 may be arranged as an integrated entity.

Furthermore, the arrangement 900 comprises at least one computer program product 908 in the form of a non-volatile or volatile memory, e.g. an EEPROM (Electrically Erasable Programmable Read-only Memory), a flash memory, a disk drive or a RAM (Random-access memory). The computer program product 908 comprises a computer program 910, which comprises code means, which when executed in the processing unit 906 in the arrangement 900 causes the arrangement and/or the RBS to perform the actions of, at least part of, any of the procedures described earlier in conjunction with FIGS. 2, 3a, 4 and 5.

The computer program 910 may be configured as a computer program code structured in computer program modules. Hence, in an exemplifying embodiment, the code means in the computer program 910 of the arrangement 900 may comprise a collecting module 910a for collecting information about a backhaul link. The computer program comprises a determining module 910b for determining, based on said information, whether a procedure is about to be performed, which entails that the capacity of the backhaul link will be reduced. The computer program 910 further comprises an estimating module 910c for estimating the capacity of the backhaul link after the forthcoming capacity reduction. The computer program 910 further comprises a determining module 910d for determining whether a traffic load of the RBS exceeds the estimated backhaul link capacity after the forthcoming capacity reduction. The computer program 910 further comprises a control module 910e, for reducing the traffic load in accordance with, e.g. to match, the estimated backhaul link capacity after the forthcoming capacity reduction when appropriate.

The modules 910a-e could essentially perform at least part of the actions indicted in FIGS. 2, 4 and 5, and could emulate a hardware arrangement, such as e.g. the arrangement 701 in an RBS illustrated in FIG. 7a. In other words, when the different modules 910a-e are executed in the processing unit 906, they may correspond to the units 704-711 of FIG. 7.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the network node.

Figure 10:
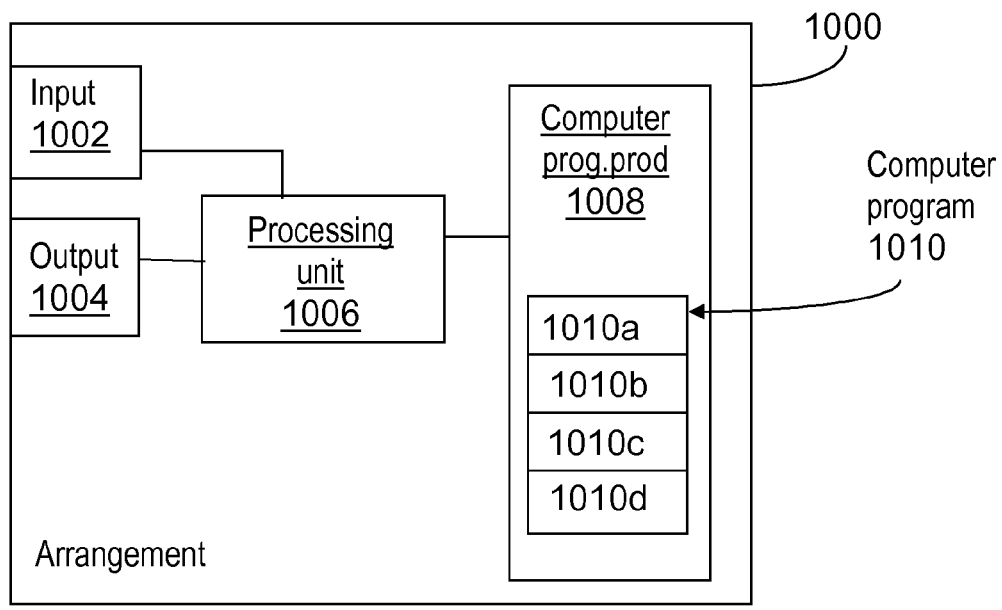

In a similar manner, an exemplifying embodiment comprising computer program modules could be described for at least part of the backhaul communication entity 703, illustrated in FIG. 7b. In FIG. 10 is illustrated an arrangement comprising a computer program product 1008, in its turn comprising a computer program 1010, comprising computer readable code modules, which when run in a network node, such as an RBS causes the network node to receive an indication of an upcoming retraining of the backhaul link from an aggregation node, which indication is to be acknowledged by the backhaul communication entity for the retraining to start; and; acknowledge the received indication upon the receiving of a certain indication from an RBS and/or after a predefined time period has elapsed.

Although the code means in the embodiments disclosed above in conjunction with FIGS. 9 and 10 are implemented as computer program modules which when executed in the processing unit causes the arrangement and/or RBS to perform the actions described above in conjunction with figures mentioned above, at least one of the code means may in alternative embodiments be implemented at least partly as hardware circuits.

It is to be understood that the choice of interacting units or modules, as well as the naming of the units are only for exemplifying purpose, and nodes suitable to execute any of the methods described above may be configured in a plurality of alternative ways in order to be able to execute the suggested process actions.

It should also be noted that the units or modules described in this disclosure are to be regarded as logical entities and not with necessity as separate physical entities.

The invention claimed is:

1. A method performed by a Radio Base Station (RBS) being associated with communication over a wire line backhaul link, and further serving a number of User Equipment's (UEs), the method comprising:
   collecting information about the backhaul link from a backhaul communication entity;
   determining, based on said information, whether a procedure is about to be performed which entails that the capacity of the backhaul link will be reduced;
   estimating the capacity of the backhaul link after the forthcoming capacity reduction;
   determining whether a traffic load of the RBS, said load being associated with the serving of UEs, exceeds the estimated backhaul link capacity after the forthcoming capacity reduction;
   when the traffic load is determined to exceed the estimated backhaul link capacity after the forthcoming capacity reduction:
      reducing the traffic load associated with the serving of UEs, in accordance with the estimated capacity of the backhaul link after the forthcoming capacity reduction; and
      indicating to the backhaul communication entity that the traffic load has been reduced in accordance with the estimated capacity of the backhaul link, thus indicating that the procedure entailing reduced backhaul link capacity may be started.

2. The method according to claim 1, wherein the traffic load is, at least partly, reduced by hand over of at least one UE of the number of UEs to a neighboring RBS.

3. The method according to claim 2, further comprising:
   receiving information about backhaul link relations of neighboring RBSs, and determining a target RBS out of the neighboring RBSs, to which at least one UE of the number of UEs is to be handed over.

4. The method according to claim 3, wherein the target RBS is determined to be a neighboring RBS, of which the backhaul link is determined not to be affected by the procedure.

5. The method according to claim 2, further comprising:
   indicating that the handover cause is related to the backhaul link.

6. The method according to claim 1, wherein the procedure is one of:
   a Seamless Rate Adaptation (SRA) procedure;
   a Save Our Showtime (SOS) procedure; or
   a retraining procedure.

7. A Radio Base Station (RBS) operable to communicate over a wire line backhaul link, and further operable to serve a number of User Equipments (UEs), the RBS comprising:
   a collecting unit adapted to collect information about the backhaul link from a backhaul communication entity;
   a determining unit adapted to determine, based on said information, whether a procedure is about to be performed, which entails that the capacity of the backhaul link will be reduced;
   an estimating unit adapted to estimate the capacity of the backhaul link after the forthcoming capacity reduction; and
   the determining unit being further adapted to determine whether a traffic load of the RBS, said load being associated with the serving of UEs, exceeds the estimated backhaul link capacity after the forthcoming capacity reduction; and
   a control unit adapted to reduce the traffic load associated with serving of UEs, in accordance with the estimated capacity of the backhaul link after the forthcoming capacity reduction when the traffic load is determined to exceed said estimated capacity of the backhaul link, and indicate to the backhaul communication entity that the traffic load has been reduced in accordance with the estimated capacity of the backhaul link, thus indicating that the procedure entailing reduced backhaul link capacity may be started.

8. The RBS according to claim 7, wherein the traffic load is, at least partly, reduced by handover of at least one UE of the number of UEs to a neighboring RBS.

9. The RBS according to claim 8, further comprising a receiving unit adapted to receive information about backhaul link relations of neighboring RBSs, and wherein the RBS is further adapted to determine a target RBS out of the neighboring RBSs, to which at least one UE of the number of UEs is to be handed over.

10. The RBS according to claim 9, wherein the target RBS is determined to be a neighboring RBS, of which the backhaul link is determined not to be affected by the procedure.

11. The RBS according to claim 8, further comprising an indicating unit, adapted to indicate that the handover cause is related to the backhaul link.

12. The RBS, according to claim 7, wherein the procedure is one of:
   a Seamless Rate Adaptation (SRA) procedure;
   a Save Our Showtime (SOS) procedure; or
   a retraining procedure.

13. A method performed by a backhaul communication entity associated with a wire line backhaul link at a Radio Base Station (RBS), the method comprising:
   receiving an indication of a forthcoming procedure related to the backhaul link from an aggregation node, which indication is to be acknowledged by the backhaul communication entity for the procedure to start; and
   before acknowledging the indication of a forthcoming procedure, awaiting at least one of:
      an indication from the RBS; or
      the elapse of a predefined time period,
   thereby enabling the RBS to adapt a traffic load associated with UEs served by the RBS to a backhaul link capacity reduction caused by the procedure, before the performing of the procedure.

14. The method according to claim 13, wherein the procedure is one of:
   a retraining procedure;
   a Seamless Rate Adaptation (SRA) procedure; and
   a Save Our Showtime (SOS) procedure.

15. The method according to claim 13, wherein the backhaul communication entity is a part of the RBS.

16. The method according to claim 13, further comprising:
provide information about the backhaul link to another unit or entity.

17. A non-transitory computer readable medium comprising computer readable code, which when run in a backhaul communication entity, causes the backhaul communication entity to perform the corresponding method according to claim 13.

18. A computer program product comprising the non-transitory computer readable medium according to claim 17.

19. A backhaul communication device, connectable to a wire line for backhaul link communication at a Radio Base Station (RBS), the backhaul communication device comprising:
a receiving unit adapted to receive, from an aggregation node, an indication of a forthcoming procedure related to the backhaul link, which indication is to be acknowledged by the backhaul communication entity for the procedure to start;
an acknowledgement unit, adapted to await at least one of:
an indication from the RBS; or
the elapse of a predefined time period,
before acknowledging the indication of a forthcoming procedure.

20. The backhaul communication device according to claim 19, wherein the procedure is one of:
a retraining procedure;
a Seamless Rate Adaptation (SRA) procedure; and
a Save Our Showtime (SOS) procedure.

21. The backhaul communication device according to claim 19, being a part of the RBS.

22. The backhaul communication device according to claim 19, further comprising:
a monitoring unit providing information about the backhaul link to another unit or entity.

* * * * *